(12) United States Patent
Kobayashi et al.

(10) Patent No.: US 8,961,161 B2
(45) Date of Patent: Feb. 24, 2015

(54) FLUID MACHINE PROVIDED WITH HERMETIC CONTAINER THAT IS SUBJECTED TO PRESSURE OF WORKING FLUID

(75) Inventors: Noriyuki Kobayashi, Isesaki (JP); Hitomi Ito, Hiratsuka (JP)

(73) Assignee: Sanden Corporation, Gunma (JP)

( * ) Notice: Subject to any disclaimer, the term of this patent is extended or adjusted under 35 U.S.C. 154(b) by 223 days.

(21) Appl. No.: 13/575,883

(22) PCT Filed: Jan. 24, 2011

(86) PCT No.: PCT/JP2011/000368
§ 371 (c)(1), (2), (4) Date: Jul. 27, 2012

(87) PCT Pub. No.: WO2011/093053
PCT Pub. Date: Aug. 4, 2011

(65) Prior Publication Data
US 2012/0308378 A1 Dec. 6, 2012

(30) Foreign Application Priority Data

Jan. 27, 2010 (JP) ................................ 2010-015414

(51) Int. Cl.
| F04C 15/00 | (2006.01) |
| F04C 27/00 | (2006.01) |
| F04B 39/12 | (2006.01) |
| B23K 9/028 | (2006.01) |
| B23K 9/16 | (2006.01) |
| B23K 9/173 | (2006.01) |
| B23K 33/00 | (2006.01) |
| F04B 39/14 | (2006.01) |

(Continued)

(52) U.S. Cl.
CPC ............. *F04B 39/121* (2013.01); *B23K 9/0286* (2013.01); *B23K 9/164* (2013.01); *B23K 9/173* (2013.01); *B23K 33/006* (2013.01); *F04B 39/14* (2013.01); *B23K 2201/12* (2013.01); *F01C 19/005* (2013.01); *F04C 23/008* (2013.01); *F04C 2230/231* (2013.01); *F04C 2240/30* (2013.01); *Y10S 418/01* (2013.01)
USPC .......................... 418/148; 418/60; 418/DIG. 1

(58) Field of Classification Search
USPC ........ 418/55.1, 60–63, 148, 270, DIG. 1, 149
See application file for complete search history.

(56) References Cited

U.S. PATENT DOCUMENTS

| 3,473,687 A | 10/1969 | Larsen et al. |
| 4,063,062 A | 12/1977 | Kuhnen |
| 5,795,140 A * | 8/1998 | Jin ................................ 417/372 |

(Continued)

FOREIGN PATENT DOCUMENTS

| JP | 51-65048 | 6/1976 |
| JP | 55-17712 | 2/1980 |

(Continued)

*Primary Examiner* — Theresa Trieu
(74) *Attorney, Agent, or Firm* — Cozen O'Connor (57) ABSTRACT

Provided is a fluid machine which can be produced to have an increased weld strength and an increased reliability, at a reduced production cost. A first and a second shells (78, 80), each having a rim and a sealing portion constituting part of the rim, are butted together with the rims (78a, 80a) held together to form a groove (82) and with the sealing portions (96, 98) in contact with each other, and joined together by a weld (84) formed in the groove over the entire length of the groove to be separated from the sealing portions by a space (100).

6 Claims, 5 Drawing Sheets

(51) Int. Cl.
*F01C 19/00* (2006.01)
*F04C 23/00* (2006.01)

(56) References Cited

U.S. PATENT DOCUMENTS

| | | |
|---|---|---|
| 2004/0052659 A1 | 3/2004 | Kim |
| 2004/0247472 A1 | 12/2004 | Horton et al. |

FOREIGN PATENT DOCUMENTS

| | | |
|---|---|---|
| JP | 7-119637 | 5/1995 |
| JP | 11-257229 | 9/1999 |
| JP | 2004-293463 | 10/2004 |
| JP | 2005-226610 | 8/2005 |
| JP | 2005-349404 | 12/2005 |

* cited by examiner

FLUID MACHINE PROVIDED WITH HERMETIC CONTAINER THAT IS SUBJECTED TO PRESSURE OF WORKING FLUID

RELATED APPLICATIONS

This application is a U.S. National Phase Application under 35 USC 371 of International Application PCT/JP2011/000368 filed Jan. 24, 2011.

This application claims the priority of Japanese application No. 2010-015414 filed Jan. 27, 2010, the entire content of which is hereby incorporated by reference.

TECHNICAL FIELD

This invention relates to a fluid machine, specifically a fluid machine suited to form a hermetic reciprocating compressor compressing carbon-dioxide refrigerant.

BACKGROUND ART

There is known a hermetic compressor which belongs to this class of fluid machine and which comprises an electric motor and a compressing mechanism arranged in a hermetic container such that drive power is transmitted from the electric motor to the compressing mechanism to compress a refrigerant.

Patent document 1 discloses a hermetic container composed of three members: a center, a top and a bottom shells, the center shell being a tubular member open at each end, and the top and bottom shells being cup-shaped members welded to each open end of the center shell, wherein welding of the shells are performed while applying a force to pools of molten metal in a weld area, in the direction in which welding progresses.

PRIOR-ART DOCUMENT

Patent Document

Patent document 1: Japanese Patent Application Laid-open No. 2005-349404

The hermetic container disclosed in the aforementioned prior-art document is composed of three members, which means that it requires welding at two locations at least, and thus, more assembly steps, resulting in an increased cost of producing the hermetic container, and thus, the compressor.

If the hermetic container is composed of only two members, i.e., top and bottom shells, it requires welding at fewer locations, and thus, fewer assembly steps, resulting in a reduced cost of producing the hermetic container.

The welding method disclosed in the aforementioned prior-art document is, however, intended to weld the cup-shaped top and bottom shells to the tubular center shell. When applied to a hermetic container composed of two cup-shaped shells, this method cannot effectively release heat generated in welding due to the absence of a central shell, resulting in unallowable thermal deformation of the shells, which leads to formation of cracks in the molten areas of the shells after welding. Due to such cracks, the weld may not have a sufficient thickness, or the weld area may include non-welded parts. If force or moment produces stress concentrated on such parts, the hermetic container may undergo fatigue breakdown.

SUMMARY OF THE INVENTION

An object of the present invention is to provide a fluid machine which can be produced to have an increased weld strength and an increased reliability at a reduced production cost.

In order to achieve the above object, a fluid machine according to one aspect of the present invention comprises a drive unit and a driven unit arranged in a hermetic container such that drive power is transmitted from the drive unit to the driven unit, the hermetic container including a first shell covering the drive unit and a second shell covering the driven unit and joined to the first shell, wherein the first and second shells each have a rim and a sealing portion constituting part of the rim, and are butted together with the rims held together to form a groove and with the sealing portions in contact with each other, and joined together by a weld formed in said groove over the entire length of the groove to be separated from the sealing portions by a space (item 1).

Specifically, the rims may each have a root edge and a recess such that said groove is defined by the root edges and said space is defined by the root edges, the recesses and the sealing portions (item 2).

The sealing portions may be provided such that a slant face of one of the sealing portions is brought into contact with a slant face of the other sealing portion, the slant faces being at an angle to the direction in which the first and second shells are butted together (item 3).

The sealing portions may be provided such that more than one face of one of the sealing portions is brought into contact with more than one face of the other sealing portion (item 4).

The first and second shells may each have a root portion forming a boundary between the recess and the weld, the root portion being shaped to help an inner end portion of the weld to form at an acute angle to the surface of the recess (item 5).

The space may have an approximately heart-shaped cross-section (item 6).

The fluid machine may be designed such that the hermetic container undergoes pressure exerted by a working fluid sucked in and discharged from the driven unit, the working fluid being carbon-dioxide refrigerant (item 7).

Effect of the Invention

In the fluid machine according to items 1 and 2, the hermetic container is constructed by joining two shells together by a single butt weld joint, or in other words, by forming a weld in a groove over the entire length of the groove by a single step of welding. Assembling the hermetic container by a single step leads to a reduced cost of producing the hermetic container, and thus, the compressor.

The provision of the space alleviates concentration of stress on the weld area, thereby suppressing formation of cracks in the weld area. It also prevents flying particles and sparks from coming into the hermetic container during welding. Further, it prevents the weld from extending into the hermetic container and at the same time allows the weld to form with a sufficient thickness, resulting in an increased weld strength, and thus, an increased reliability of the fluid machine.

In the fluid machine according to item 3, the shells are butted together with the slant faces of the sealing portions in contact with each other. This design allows assembly error in the direction in which the shells are butted together and in the direction at right angles to this direction, namely shells' radial direction. This obviates the need for strict shell-size accuracy control and provides ease of positioning and assembling the shells.

During welding, particles and sparks are likely to fly toward the radial center of the shells. The sealing portions with their slant faces in contact with each other can effectively prevent the particles and sparks from coming into the hermetic container during welding.

During welding, particles and sparks are likely to fly toward the radial center of the shells. In the fluid machine according to item 4, sealing portions are provided such that more than one face of one of the sealing portion is brought into contact with more than one face of the other sealing portion. The sealing portions thus provide a step-like sealing, leading to an increased reliability of preventing the particles and sparks from coming into the hermetic container during welding.

In the fluid machine according to item 5, the shells each have a root portion shaped to help an inner end portion of the weld to form at an acute angle to the surface of the recess. This allows the weld to be so formed as to connect to the recess surface smoothly at an obtuse angle, and thus, makes it unlikely that stress is concentrated at the boundary between the weld and the base material, or shells and produces cracks. The weld area has thus a further increased weld strength.

In the fluid machine according to item 6, the approximately heart-shaped space ensures that the weld is so formed as to connect to the recess surface smoothly at an obtuse angle, with its inner end portion being as far away from the sealing portions as possible. The presence of such space effectively prevents particles and sparks from coming into the hermetic container during welding, and contributes to providing a weld area having an increased weld strength.

When the working fluid is carbon-dioxide refrigerant, the working fluid is discharged from the driven unit in a supercritical state, and thus, at very high pressure. The inner side of the hermetic container can therefore be subjected to very high pressure, and thus, normally, for safety's sake, the hermetic container cannot avoid having a great thickness and weight and needs to have high weld strength in the weld area of the shells. The present invention, which provides a weld area having an increased weld strength, and thus, an increased reliability of the compressor because of the above-described structural features, is therefore favorable.

MODE OF CARRYING OUT THE INVENTION

FIGS. 1 to 4 show a compressor 1 presented as a first embodiment of fluid machine.

Figure 1:
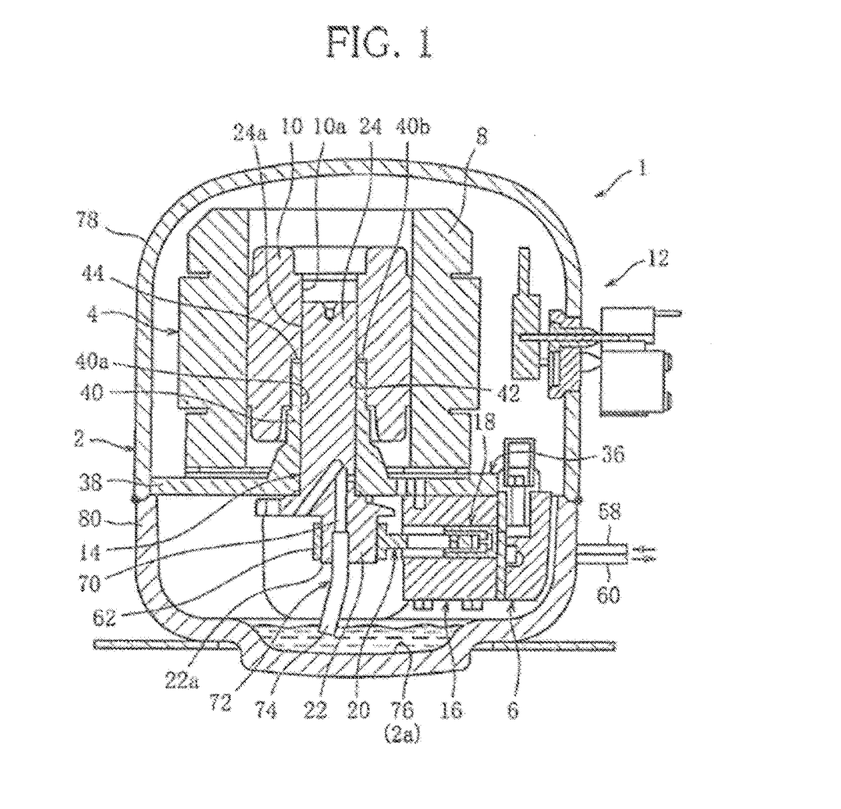
FIG. 1 is a vertical cross-sectional view of a compressor in accordance with a first embodiment of the present invention.

The compressor 1 is a hermetic reciprocating compressor, which belongs to the class of positive-displacement compressors called reciprocating compressors or piston compressors and which is incorporated into, for example an automatic vending machine to constitute a refrigeration cycle circuit, not shown.

The refrigeration cycle circuit has a circulation path along which a refrigerant, or working fluid of the compressor 1 circulates. The refrigerant is for example carbon dioxide, which is a non-combustible natural refrigerant.

As seen in FIG. 1, the compressor 1 comprises a hermetic container 2 enclosing an electric motor (drive unit) 4 and a compressing mechanism (driven unit) 6, the latter being supplied with drive power from the former.

The electric motor 4 comprises a stator 8 supplied with current to generate a magnetic field, and a rotor 10 rotating in the magnetic field generated by the stator 8. The rotor 10 is arranged within the stator 8, coaxially, and fixed on a main shaft portion 24 of a crankshaft 14, described later, by heat-fitting. Current is supplied to the stator 8 from outside the compressor 1 via electric components 12 fixed to the hermetic container 2 and leads, not shown.

The compressing mechanism 6 is composed of a crankshaft 14, a cylinder block 16, a piston 18, a connecting rod 20 and others. The crankshaft 14 includes an eccentric shaft portion 22 and a main shaft portion 24.

Figure 2:
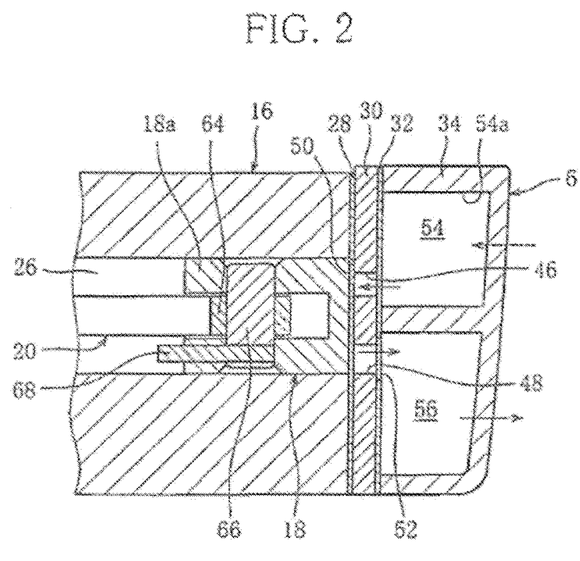
FIG. 2 is an enlarged view showing a relevant part of a compressing mechanism shown in FIG. 1.

As seen in FIG. 2, the cylinder block 16 has a cylinder bore 26. A cylinder gasket 28, a suction valve 50, described later, a valve plate 30, a head gasket 32 and a cylinder head 34, arranged in this order, are fastened to the cylinder block 16 with bolts to close an entrance to the cylinder bore 26.

As seen in FIG. 1, the stator 8 is bolted to the cylinder block 16 with a frame 36 between, the frame 36 being joined to the hermetic container 2.

Specifically, the frame 36 includes a lower base portion 38 joined to the hermetic container 2 and supporting the electric motor 4 and the compressing mechanism 6, and an upper cylindrical portion 40 with a bearing 42 arranged on an inner circumferential face 40a and a bearing 44 on a top face 40b. The bearing 42 supports the main shaft portion 24, and the bearing 44 in the form of a thrust race (bearing), a thrust washer or the like supports a thrust load generated by the rotor 10.

As seen in FIG. 2, the valve plate 30 has a refrigerant suction hole 46 and a refrigerant discharge hole 48 opened and closed by a suction valve 50 and a discharge valve 52, respectively. The suction and discharge valves are reed valves.

The cylinder head 34 has a refrigerant suction chamber 54 and a refrigerant discharge chamber 56. In the compression stroke of a piston 18, the discharge valve 52 opens to allow a flow from the cylinder bore 26 to the discharge chamber 56 through the discharge hole 48. In the suction stroke of the piston 18, the suction valve 50 opens to allow a flow from the suction chamber 54 to the cylinder bore 26 through the suction hole 46.

A suction pipe 58 and a discharge pipe 60 are fitted to the hermetic container 2. The suction and discharge pipes 58, 60 connect to the suction and discharge chambers 54, 56 in the cylinder head 34, at an end, respectively, and to the refrigeration cycle circuit at the other end. Suction and discharge mufflers, not shown, are incorporated in the suction and discharge pipes to reduce pulsation and noise of the refrigerant flowing therein, The connecting rod 20 has a large end portion 62 connected to the eccentric shaft portion 22 of the crankshaft 14 in a manner allowing rotating motion of the crankshaft, and an opposite small end portion 64 connected to the piston 18 in a manner allowing reciprocating motion of the piston. The small end portion 64 is connected to the piston 18 by a piston pin 66, which is prevented from coming off the piston 18 by a fixing pin 68.

As the crankshaft 14 rotates, eccentric rotation of the eccentric shaft portion 22 makes the connecting rod 20 swing on the piston pin 66, which in turn makes the piston 18 reciprocate within the cylinder bore 26.

The inside of the hermetic container 2 is mostly subjected to refrigerant discharge pressure. A lubricant lubricating sliding parts of the electric motor 4 and of the compressing mechanism 6, such as the bearings 42, 44, collects in an inner bottom portion 2a of the hermetic container 2 in a small amount.

The crankshaft 14 has an oil passage (lubricating system) 70 extending approximately from the shaft center at the bottom 22a of the eccentric shaft portion 22 to the middle of the main shaft portion 24. The oil passage 70 has an upper end open at the outer circumferential face 24a of the main shaft portion 24 and a lower end connected to an oil pipe (lubricating system) 72. The oil pipe 72 includes a lower slant portion 74 slanting in a manner approaching the shaft center of the main shaft portion 24 approximately from the shaft center of the eccentric shaft portion 22. The slant portion 74 of the oil pipe 72 extends downward into an inner bottom portion 2a of the hermetic container 2 in the shape of a recess, the inner bottom portion 2a thus serving as an oil reservoir 76.

The oil reservoir 76 has an area and a depth ensuring that a small amount of the lubricant, more or less 200 cc, for example, has an oil surface at the level of the lower end of the oil pipe 74 or above. As the crankshaft 14 rotates, the oil pipe 72 eccentrically rotates with the eccentric shaft portion 22, resulting in the lubricant moving up the oil passage 74 from the oil reservoir 76 by centrifugal force acting on the lubricant in the slant portion 74 of the oil pipe 72 in the obliquely in- and upward direction.

The operation and action of the compressor 1 will be described below.

The compressor 1 is designed such that as the stator 8 is supplied with current, the rotor 10 fixed on the main shaft portion 24 rotates, and thus, the crankshaft 14 rotates, which in turn makes the piston 18 reciprocate within the cylinder bore 18 by means of the connecting rod 20. As the piston 18 reciprocates, the refrigerant is sucked into the cylinder bore 26 from the refrigeration cycle circuit, compressed in the cylinder bore 26 and discharged from the cylinder bore to the refrigeration cycle circuit.

Specifically, the piston 18 moves in the direction decreasing the volume of the cylinder bore 26, so that the refrigerant is compressed within the cylinder bore 26. When the pressure in the cylinder bore 26 exceeds refrigerant discharge pressure, the discharge valve 52 opens because of pressure difference between the cylinder bore 26 and the discharge chamber 56. The refrigerant compressed thus flows from the cylinder bore into the discharge chamber 56 through the discharge hole 48, and then to the refrigeration cycle circuit through the discharge pipe 60.

After reaching the top dead center, the piston 18 moves in the direction increasing the volume of the cylinder bore 26, and thus, the pressure in the cylinder bore 26 decreases and the discharge valve 52 closes because of pressure difference between the cylinder bore 26 and the discharge chamber 56.

When the pressure in the cylinder bore 26 decreases to refrigerant suction pressure or below, the suction valve opens 50 because of pressure difference between the cylinder bore 26 and the suction chamber 54. The refrigerant thus flows into the suction chamber 54 through the suction pipe 58, and then into the cylinder bore 26 through the suction hole 46.

After reaching the bottom dead center, the piston 18 moves in the direction decreasing the volume of the cylinder bore 26, and thus, the refrigerant is again compressed within the cylinder bore 26. The process of sucking the refrigerant from the refrigeration cycle circuit into the cylinder bore 26, compressing it within the cylinder bore 26 and discharging it from the cylinder bore to the refrigeration cycle circuit is repeated this way.

The above-described operation of the compressor 1 makes the lubricant move from the oil reservoir 76 up into the oil passage 70, then flow out of the oil passage 70 down toward the eccentric shaft portion 22, thus lubricating parts including the large end portion 62, and splash over the piston 18 by centrifugal force, thus lubricating parts including a skirt portion 18 of the piston 18.

Part of the lubricant flows out of the oil passage 70 and moves upward along a groove in the circumferential face of the crankshaft 14, not shown, by centrifugal force, thereby forming an oil film between the crankshaft 14 and the frame 36, thus lubricating the bearing 42, and moves further up toward the top of the crankshaft 14. After reaching the top face 40b of the cylindrical portion 40 and lubricating the bearing 44, the lubricant flows down into the oil reservoir 76 by gravity. The part of the lubricant not passing over the bearing 44 moves further up the inner wall surface 10a of the rotor 10 to reach the top of the rotor 10, and splashes accompanying the rotation of the rotor 10, by centrifugal force, thus cooling the stator 8, and falls into the oil reservoir 76 by gravity.

While lubricating the parts including the skirt portion 18a of the piston 18, part of the lubricant is sucked into the cylinder bore 26 in the form of oil mist, which flows into a space between the piston 18 and the cylinder block 18 together with a refrigerant gas leaking from the cylinder bore 26, thus sealing and lubricating the piston 18 and the cylinder block. The lubricant adhering to the wall surface 54a of the suction chamber 54 falls into the oil reservoir 76 by gravity. The lubricant falling into the oil reservoir 76 again moves up through the oil pipe 72. The lubricant thus circulates within the hermetic container 2, lubricating and sealing the sliding parts of the electric motor 4 and of the compressing mechanism 6.

Figure 3:
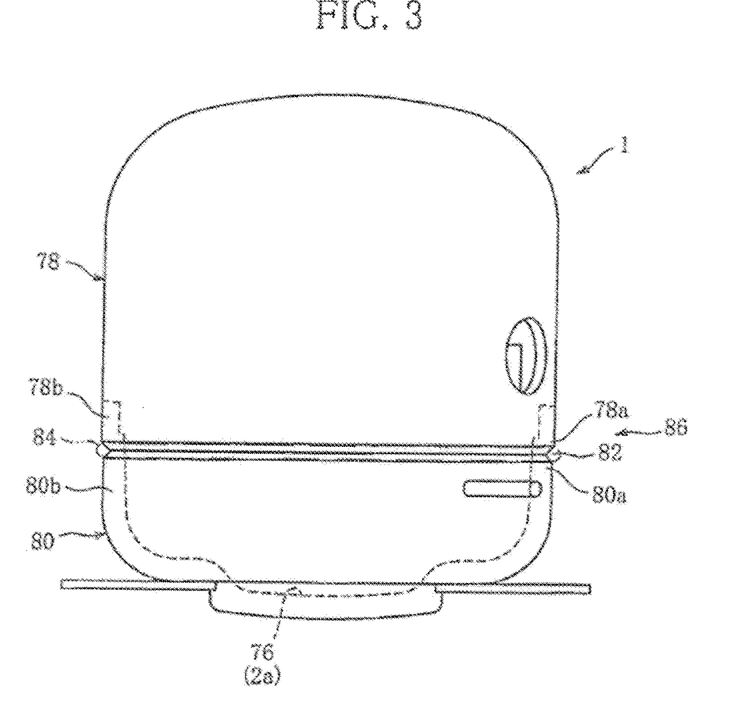
FIG. 3 is a diagram showing the outer shape of a hermetic container of the compressor shown in FIG. 1.

In the present embodiment, as seen from FIG. 3, the hermetic container 2 is a shell structure composed of two shells: a top shell (first shell) 78 covering the electric motor 4 and a bottom shell (second shell) 80 covering the compressing mechanism 6. Within the hermetic container 2, the crankshaft 14 and the connecting rod 20 need to be arranged approximately at right angles to each other, and thus, the electric motor 4 is arranged in the top shell 78 with its length aligned with the depth of the top shell, while the compressing mechanism 6 is arranged in the bottom shell 80 with its length aligned with a diameter of the bottom shell 80. The top shell 78 has therefore a great depth compared with the bottom shell 80.

The top shell 78 is formed by press-forming, more specifically deep-drawing a soft steel, such as SPCC or SPHE, into a simple shape like a dome. The top shell 78 is formed as thin as possible, specifically into a thickness of more or less 6.8 mm at the thinnest portion and more or less 7 mm even at thick portions. Work hardening during deep drawing provides a sufficient resistance to high pressure exerted by the refrigerant on the inner side of the hermetic container 2.

The bottom shell 80, on the other hand, is formed by forging a soft steel, such as S20C or S25C. The bottom shell 80 is formed as thin as possible, specifically into a thickness of more or less 8.5 mm. Like the top shell 78, the bottom shell has a sufficient resistance to high pressure exerted by the refrigerant.

The shells 78, 80 are butted together with their rims 78*a*, 80*a* held together, where the rims provide a V-shaped groove 82. The shells are joined together by a weld 84 formed in the groove 82 by continuously producing beads of molten metal over the entire length of the groove 82 by a single step of MAG welding ($CO_2$ gas arc welding). In other words, the shells 78, 80 are joined together by a single butt weld joint 86 formed by a single step of welding.

Figure 4:
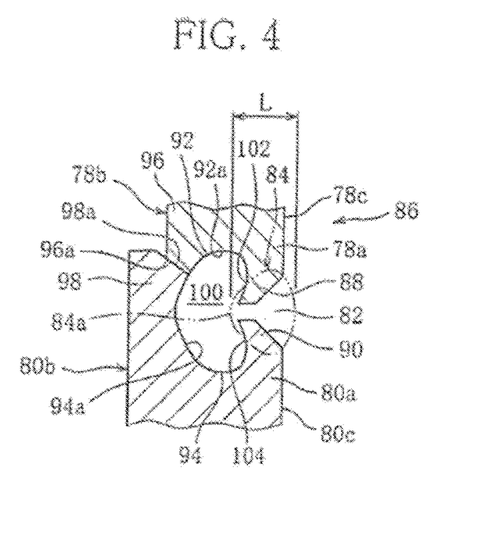
FIG. 4 is an enlarged view showing a weld joint of the hermetic container shown in FIG. 3.

As seen in FIG. 4, the rims 78*a*, 80*a* each have a root edge 88, 90, a recess 92, 94 and a sealing portion 96, 98. The root edges are provided to define the aforementioned groove 82, the recesses are vertically-oriented hollows in the side walls 78*b*, 80*b* of the shells, and the sealing portions are provided to be brought into contact with each other. The root edge, the recess and the sealing portion, arranged in this order, provide a continuous outline continuing from the outer surface 78*c*, 80*c* of the side wall 78*b*, 80*b* of each shell 78, 80.

The root edges 88, 90, the recesses 92, 94 and the sealing portions 96, 98 define a space 100, into which an inner end portion 84*a* of the weld 84 extends.

The inner end portion 84 is made primarily from base material, or metal melted from the shells 78, 80. The provision of the space 100 ensures that the molten metal forms a weld 84 with a thickness L enough for the hermetic container 2 to have a sufficient resistance to pressure, without reaching the sealing portions 96, 98. The space 100 is sealed by the root edges 88, 90, the recesses 92, 94, the sealing portions 96, 98 and the weld 84 resulting from welding.

In the present embodiment, the shells are abutted together with slant faces 96*a*, 98*a* of the sealing portions 96, 98 in contact with each other, where the slant faces are at an angle to the direction in which the shells are butted together with their rims 78*a*, 80*a* held together.

The slant faces 96*a*, 98*a* are provided to come in contact with each other above the groove 92 when the shells are butted together to define the space 100. The bottom shell 80 is so designed that the sealing portion 98 having the slant face 98*a* is an upward projecting portion. The bottom shell 89 has a side wall 80*b* somewhat greater in thickness than the side wall 78*b* of the top shell 78, which enables this contact between the slant faces 96*a*, 98*b*.

The shells each have a root portion 102, 104 forming a boundary between the weld 84 and the recess 92, 94, the root portions being so shaped as to help the inner end portion 84*a* of the weld 84 to form at an acute angle to the surfaces 92*a*, 94*a* of the recesses 92, 94 so that the space 100 has an approximately heart-shaped cross-section.

In the above-described compressor 1 presented as a first embodiment, the hermetic container 2 is constructed by joining two shells 78, 80 together by a single butt weld joint 86, or in other words, by forming a weld 84 in the groove 82 over the entire length thereof by a single step of welding. The hermetic container 2 can thus be assembled by a single step, leading to a reduced cost of producing the hermetic container 2, and thus, the compressor 1.

The provision of the space 100 alleviates concentration of stress at the boundary between the weld 84 and the shell surface 92*a*, thereby suppressing formation of cracks. It also prevents flying particles and sparks from coming into the hermetic container 2 during welding. Further, it prevents the weld 2 from breaking through the side walls 78*b*, 80*b* and extending into the hermetic container 2, and at the same time allows the weld 84 to form with a sufficient thickness L, resulting in an increased weld strength, and thus, an increased reliability of the compressor 1.

The shells are butted together with the slant faces 96*a*, 98*a* of the sealing portions 96, 98 in contact with each other. This design allows assembly error in the direction in which the shells 78, 80 are butted together and in the direction at right angles to this direction, namely shells' radial direction. This obviates the need for strict size accuracy control for the shells 78, 80 and provides ease of positioning and assembling the shells 78, 80.

During welding, particles and sparks are likely to fly toward the radial center of the shells 78, 80. The sealing portions 96, 98 with their slant faces 96*a*, 98*a* in contact with each other can effectively prevent the particles and sparks from coming into the hermetic container 2 during welding.

The root portions 102, 104 help the inner end portion 84*a* of the weld 84 to form at an acute angle to the surfaces 92*a*, 94*a* of the recesses 92, 94. As a result, the weld 84 is so formed as to connect to the surfaces 92*a*, 94*a* of the recesses 92, 94 smoothly at an obtuse angle. This makes it unlikely that stress is concentrated at the boundary between the weld 84 and the base material, or shells 78, 80 and produces cracks. The weld 84 area has thus a further increased weld strength.

The approximately heart-shaped space 100 ensures that the weld 84 is so formed as to connect to the surfaces 92*a*, 94*a* of the recesses 92, 94 smoothly at an obtuse angle, with its inner end portion 84*a* being as far away from the sealing portions 96, 98 as possible. The presence of the space 100 thus effectively prevents particles and sparks from coming into the hermetic container 2 during welding, and at the same time contributes to providing a weld 84 area having an increased weld strength.

The present invention is not restricted to the above-described embodiment, which may modified in various ways.

Figure 5:
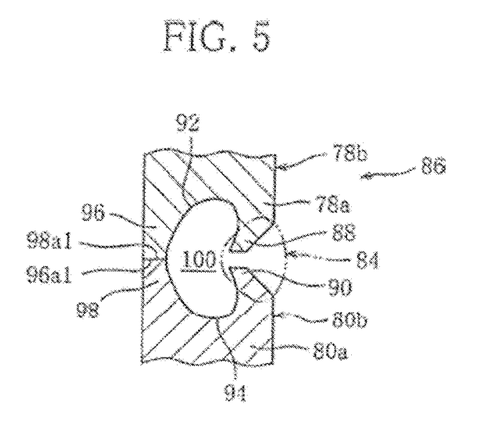
FIG. 5 shows a variant of the weld joint shown in FIG. 4.

Specifically, in the described embodiment, the shells are butted together with the slant faces 96*a*, 98*a* of the sealing portions 96, 98 in contact with each other. The bottom shell 80 formed by forging has a side wall 80*b* somewhat greater in thickness than the side wall 78*b* of the top shell 78 formed by press-forming, which enables this contact between the slant faces 96*a*, 98*a*, The shells 78, 80, however, do not need to be formed by these working processes but may be formed by other working processes, and may be designed differently in consideration of thicknesses of the side walls 78*b*, 80*b* of the shells 78, 80 resulting from the working processes applied. As shown in FIG. 5, if the shells 78, 80 are formed by working processes resulting in approximately the same thickness of side walls 78*b*, 80*b*, for example, the shells may have sealing portions 96, 98 providing end faces 96*a*1, 98*a*1 at right angles to the direction in which the shells are butted together with the rims 78*a*, 80*a* held together, so that the shells are butted together with the end faces 96*a*1, 98*a*1 in contact with each other.

Figure 6:
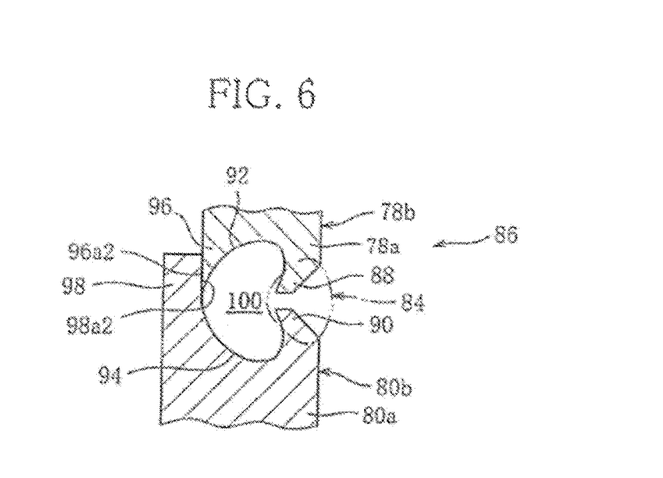
FIG. 6 shows another variant of the weld joint shown in FIG. 4.

As shown in FIG. 6, if the shells 78, 80 are formed by working processes resulting in a side wall 80*b* of the bottom shell 80 being significantly greater in thickness than the side wall 78*b* of the top shell 78, for example, the shells may have sealing portions 96, 98 providing end faces 96*a*2, 98*a*2 parallel to the direction in which the shells are butted together with the rims 78*a*, 80*a* held together, so that the shells are butted together with the end faces 96*a*2, 98*a*2 in contact with each other. The shells butted together with the end faces 96*a*1, 98*a*1 in contact with each other as well as the shells butted together with the end faces 96*a*2, 98*a*2 in contact with each other can prevent flying particles and sparks from coming into the hermetic container 2 during welding.

Figure 7:
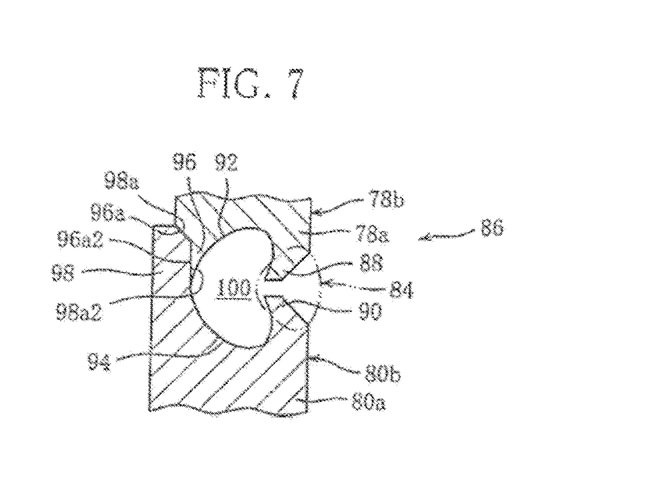
FIG. 7 shows yet another variant of the weld joint shown in FIG. 4.

The sealing portions 96, 98 are not restricted to the shapes in the above-described embodiment and variants. As shown in FIG. 7, the sealing portions may each have a stepped shape providing more than one face to be brought into contact with more than one face of the other sealing portion. Specifically, the sealing portion 96 may have a slant face 96a and a side face 96a2 to be brought into contact with a slant face 98a and a side face 98a2 of the other sealing portion 98. Such sealing portions provide a step-like sealing, which is favorable because it provides an increased reliability of preventing particles and sparks from coming into the hermetic container during welding.

The root portions 102, 104, which help the inner end portion 84a of the weld 84 to form at an acute angle to the surfaces 92a, 94a of the recesses 92 94, are not indispensable. Further, the space 100 may be a shape other than the heart shape, although the provision of the space 100 is indispensable. The space of a shape other than the heat shape can at least alleviate concentration of stress on the weld 84 area, thereby suppressing formation of cracks, prevent flying particles and sparks from coming into the hermetic container 2 during welding, and also prevent the weld 84 from breaking through the side walls 78b, 80b and extending into the hermetic container 2.

In the described embodiment, the electric motor 4 is arranged in an upper part of the hermetic container 2 while the compressing mechanism 6 in a lower part thereof. It may be altered such that the electric motor 4 is arranged in a lower part of the hermetic container 2 while the compressing mechanism 6 in an upper part thereof. This means that the top shall 78 covers the compressing mechanism 6 and the bottom shell 80 covers the electric motor 4.

Although the working fluid of the present embodiment, or compressor 1 is carbon-dioxide refrigerant, the working fluid is not restricted to carbon-dioxide refrigerant. When the working fluid is carbon-dioxide refrigerant, the working fluid is discharged from the compressing mechanism 6 in a supercritical state, and thus, at very high pressure. The inner side of the hermetic container 2 can therefore be subjected to very high pressure, and thus, normally, for safety's sake, the hermetic container 2 cannot avoid having a great thickness and weight, and needs to have high weld strength in the weld 84 area of the shells 78, 80. The present invention, which provides a weld 84 area having an increased weld strength, and thus, an increased reliability of the compressor because of the above-described structural features, is therefore favorable.

Although the described embodiment is a positive-displacement compressor 1, the present invention is applicable to hermetic fluid machines in general, including scroll compressors and expanders. Needless to say, fluid machines to which the present invention is applied can be used to constitute a refrigeration cycle circuit incorporated in apparatuses other than vending machines.

The invention claimed is:

1. A fluid machine comprising a drive unit and a driven unit arranged in a hermetic container such that drive power is transmitted from the drive unit to the driven unit, the hermetic container including a first shell covering the drive unit and a second shell covering the driven unit and joined to the first shell, wherein the first and second shells each have a rim and a sealing portion constituting part of the rim, and are butted together with the rims held together to form a groove and with the sealing portions in contact with each other, and joined together by a weld formed in said groove over the entire length of the groove to be separated from the sealing portions by a space, and wherein the sealing portions are configured such that a slant face of one of the sealing Portions is brought into contact with a slant face of the other sealing portion, the slant faces being at an angle to the direction in which the first and second shells are butted together.

2. The fluid machine according to claim 1, wherein the rims each have a root edge and a recess such that said groove is defined by the root edges and said space is defined by the root edges, the recesses and the sealing portions.

3. The fluid machine according to claim 2, wherein the first and second shells each have a root portion forming a boundary between the recess and the weld, the root portion being shaped to help an inner end portion of the weld to form at an acute angle to the surface of the recess.

4. The fluid machine according to claim 3, wherein said space has an approximately heart-shaped cross-section.

5. The fluid machine according to claim 1, wherein the sealing portions are provided such that more than one face of one of the sealing portions is brought into contact with more than one face of the other sealing portion.

6. The fluid machine according to claim 1, wherein the hermetic container undergoes pressure exerted by a working fluid sucked in and discharged from the driven unit, the working fluid being carbon-dioxide refrigerant.

\* \* \* \* \*